United States Patent [19]

Moore et al.

[11] Patent Number: 4,718,167

[45] Date of Patent: Jan. 12, 1988

[54] SEMI-AUTOMATIC ELECTRICAL HARNESS FABRICATING APPARATUS AND METHOD

[75] Inventors: Robert L. Moore, LaGrange; Jacob S. Haller, Park Ridge, both of Ill.

[73] Assignee: Molex Incorporated, Lisle, Ill.

[21] Appl. No.: 18,084

[22] Filed: Feb. 24, 1986

[51] Int. Cl.[4] ...................... H01R 43/04; B23P 19/04

[52] U.S. Cl. ....................................... 29/861; 29/748; 29/749

[58] Field of Search ............. 29/861, 748, 749, 33 M, 29/564.1

[56] References Cited

U.S. PATENT DOCUMENTS

| | | | |
|---|---|---|---|
| 4,434,551 | 3/1984 | Holt | 29/861 |
| 4,454,651 | 6/1984 | Caveney et al. | 29/749 X |
| 4,493,147 | 1/1985 | Bakermans | 29/748 X |
| 4,517,718 | 5/1985 | Johnson, Jr. | 29/748 X |
| 4,525,927 | 7/1985 | Guerout et al. | 29/861 |
| 4,590,650 | 5/1986 | Brown et al. | 29/749 X |

*Primary Examiner*—Howard N. Goldberg
*Assistant Examiner*—Carl J. Arbes
*Attorney, Agent, or Firm*—John W. Cornell; Louis A. Hecht

[57] ABSTRACT

An improved method and apparatus are provided for fabricating an electrical harness including a connector and a plurality of conductors. The connector has a plurality of terminals preloaded partially into a housing with a conductor-receiving terminal portion outside of the housing. One or more connectors are manually positioned within a frame of the electrical harness fabricating apparatus. An operational cycle of the electrical harness apparatus begins when a conductor is detected at a predetermined position within a conductor-guide channel. The conductors are sequentially terminated into the terminals outside of the housing and the previously terminated terminals are fully inserted into the housing.

20 Claims, 11 Drawing Figures

SEMI-AUTOMATIC ELECTRICAL HARNESS FABRICATING APPARATUS AND METHOD

BACKGROUND OF THE INVENTION

1. Field of the Invention

The present invention relates to a method and apparatus for fabricating an electrical harness including a connector electrically connected to a plurality of conductors, and more particularly to an improved method and semi-automatic apparatus for fabricating an electrical harness including a plurality of insulation clad conductors electrically connected to a connector of the type having two rows of insulation displacement terminals.

2. Description of the Prior Art

Insulation displacement terminals are widely used to make electrical connections with insulation clad wires because the step of removing insulation from a conductor prior to termination of the wire is eliminated. An example of an electrical harness fabrication machine which produces harnesses utilizing a connector of the type including a plurality of insulation displacement terminals is disclosed in U.S. Pat. No. 4,590,650, issued May 27, 1986 and assigned to the same assignee as the present invention. The disclosed electrical harness fabrication machine produces harnesses which include ribbon cable having a connector at each end. These electrical harnesses are produced by mass terminating the insulation clad conductors to the conductor-receiving portions of the terminals, then the terminals are inserted fully into the connector housing and a carrier strip that maintains the end spacing between the terminals during their mass termination is removed at some point subsequent to the termination.

SUMMARY OF THE INVENTION

Among the important objects of the present invention are to provide an improved method and apparatus for fabricating electrical harnesses; to provide such apparatus that can be used with a connector having either a single or dual rows of terminals; to provide such apparatus that can be used to terminate wires of different gauges to insulation displacement terminals; and to provide such apparatus for sequentially terminating individual insulation clad conductors to insulation-displacing terminal portions outside of a housing of the connector and sequentially inserting the terminated conductor and terminal portions into the housing.

In brief, in accordance with the above and other objects of the invention, there is provided an improved method and apparatus for fabricating an electrical harness including a connector and a plurality of conductors. The connector has a plurality of terminals preloaded partially into a housing with a conductor-receiving terminal portion outside of the housing. One or more connectors are manually positioned within a frame of the electrical harness fabricating apparatus. A first conductor-receiving terminal portion of the first connector is spaced apart and generally aligned with a conductor insertion blade. A first operational cycle of the electrical harness apparatus begins when a conductor is detected at a predetermined position within a conductor-guide channel. The conductor is terminated into the first conductor-receiving terminal portion. Then a connector carrying slide is moved one step to position a next adjacent conductor-receiving terminal portion generally aligned with the conductor-guide channel. Next, successive operational cycles of the harness fabricating apparatus are performed until at least one electrical harness is completed. Each of the successive operational cycles begins when a conductor is detected at the predetermined position within the conductor-guide channel. This conductor is terminated into the adjacent conductor-receiving terminal portion, the previously terminated conductor and terminal portion is inserted into the housing, and the connector carrying slide is moved one step to position a next adjacent conductor-receiving terminal portion adjacent to the conductor insertion blade. The successive operational cycles are continued until the last conductor is terminated into the last conductor-receiving terminal portion. Then the connector carrying slide is moved one step and the last terminated conductor and conductor-receiving terminal portion is inserted into the housing.

BRIEF DESCRIPTION OF THE DRAWINGS

The present invention together with the above and other objects and advantages may be best understood from the following detailed description of the preferred embodiment of the invention illustrated in the drawings, wherein.

DETAILED DESCRIPTION OF THE PREFERRED EMBODIMENT

Figure 1:
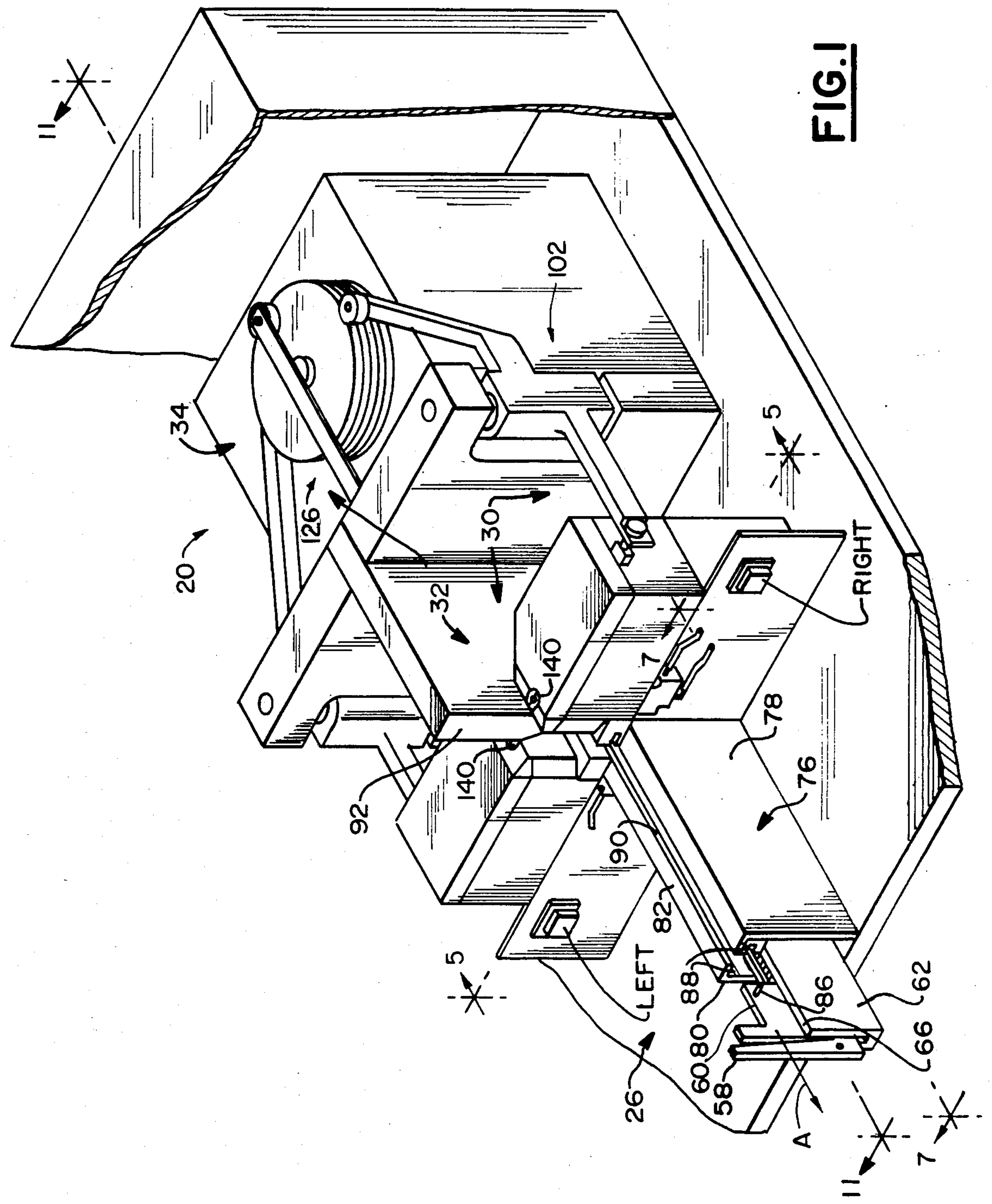
FIG. 1 is a perspective view of an electrical harness fabricating apparatus constructed in accordance with the present invention.
Figure 7:
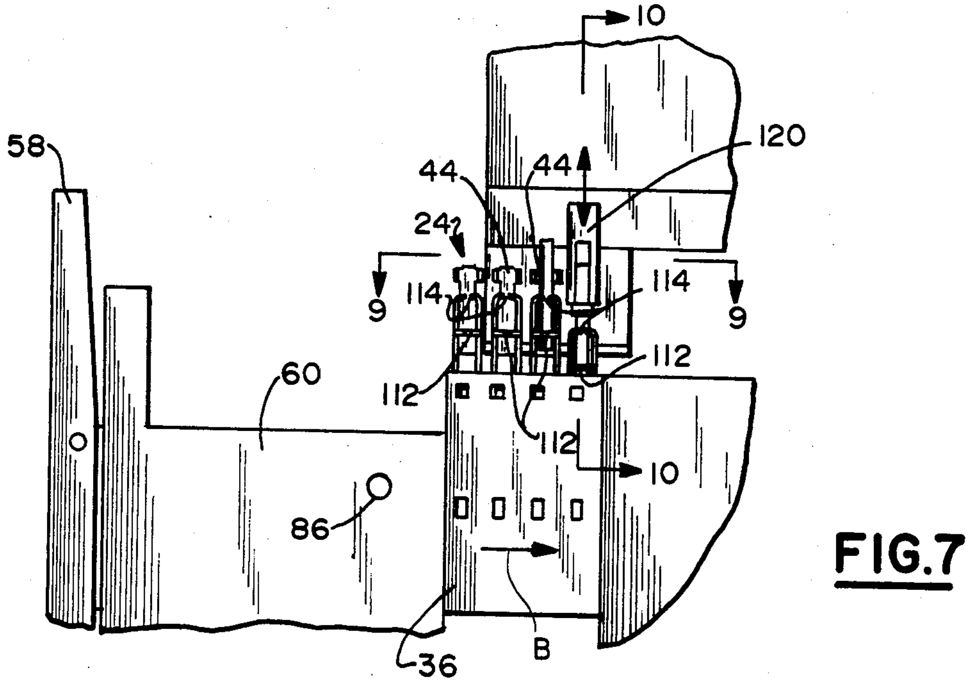
FIG. 7 is a fragmentary cross-sectional view taken along the line 7—7 of FIG. 1.
Figure 8:
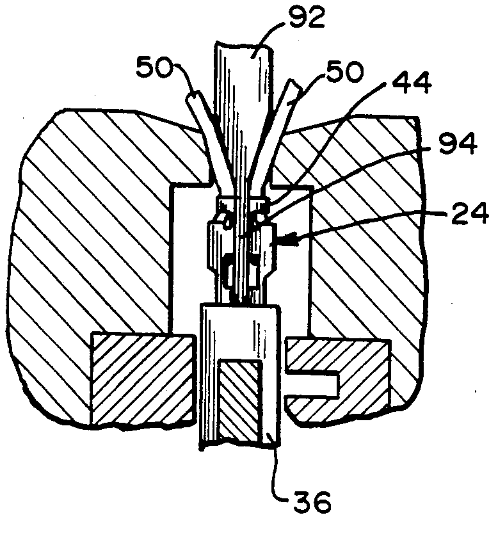
FIG. 8 is a view similar to FIG. 5.

Referring to FIG. 1 of the drawings, there is illustrated an electrical harness fabricating apparatus designated as a whole by the reference numeral 20 and constructed in accordance with the principles of the present invention. In general, the apparatus or tool 20 is used for fabricating an electrical harness that includes a connector electrically connected to a plurality of conductors. Although various different types of connectors can be used advantageously with the tool 20, specifically a connector (designated as a whole by the reference numeral 22 in FIGS. 2 and 3) is especially well adapted for such use and includes a plurality of insulation displacement terminals designated by the reference numeral 24. The connector 22 is illustrated in FIGS. 2-10 and is described herein as used with the tool 20.

The illustrated connector 22 includes two opposed rows of four terminals 24, however, it should be understood that the harness fabricating tool 20 can be used with various different connectors such as, for example, connectors including between four and twenty-seven terminals in two opposed rows or in a single row.

Figure 2:
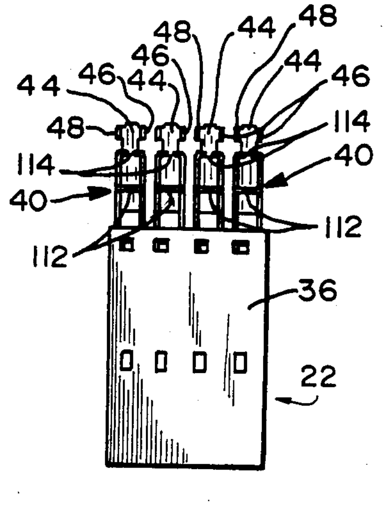
FIG. 2 is an elevational view of a connector arranged in accordance with the present invention for use with the apparatus of FIG. 1.
Figure 3:
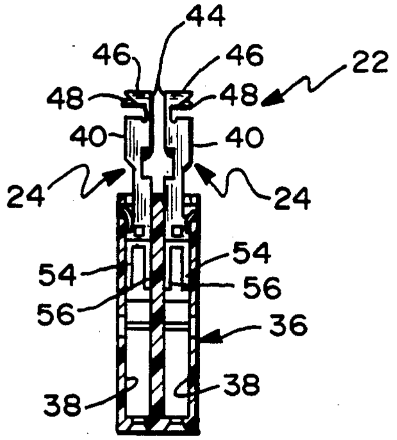
FIG. 3 is an end elevational view of the connector of FIG. 2.
Figure 4:
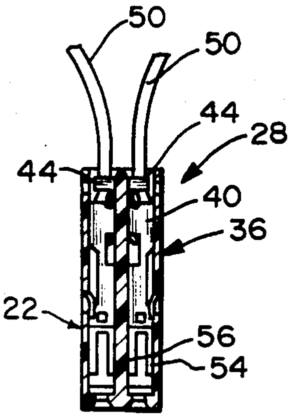
FIG. 4 an end elevational view of a completed electrical harness fabricated by the apparatus of FIG. 1 using the connector of FIGS. 2 and 3.

In general, the harness fabricating tool 20 includes a nest 26 (FIG. 1) for receiving one or more of the connectors 22 as shown in FIGS. 2 and 3 and thereafter for permitting removal of a completed electrical harness 28 as shown in FIG. 4. The tool includes a termination assembly designated generally by the reference numeral 30 for sequentially terminating conductors into the terminals 24, and a terminal insertion assembly generally designated by the reference numeral 32 sequentially for inserting the terminated terminals into the connector 22. A drive motor assembly 34 is operatively coupled to the termination and terminal insertion assemblies 30 and 32 and to the connector nest 26.

Figure 9:
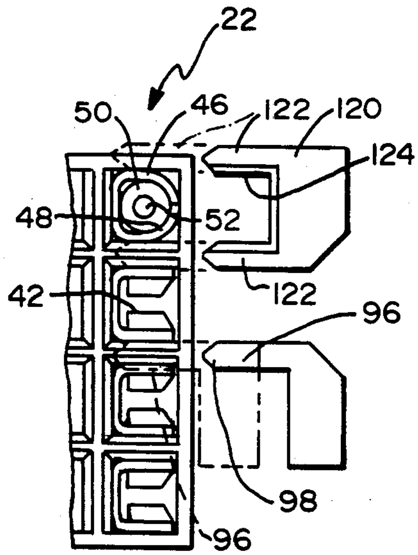
FIG. 9 is a sectional view taken along the line 9—9 of FIG. 7.

Referring now to FIGS. 2 and 3, the connector 22 includes an electrically insulative housing 36 with a plurality of terminal receiving cavities 38 formed therein. The insulation displacement terminals 24 are preloaded partially into the terminal-receiving cavities 38 with a conductor-receiving terminal-end portion 40 extending outside of the housing 36. The terminals 24 are fabricated in a strip with the free-end portions 40 interconnected with a carrier strip (not shown), the carrier strip having been removed subsequently. Each conductor-receiving terminal portion 40 includes at least one insulation displacement slot 42 (FIG. 9) and a strain relief portion 44 including a pair of strain relief arms 46 and 48 that may be deformed to grip an insulation clad conductor 50 that is connected to the terminal, as shown in FIG. 9. The insulation displacement slot or slots 42 are adapted to receive an insulation clad conductor 50 and edges of the slots displace the insulation to contact and make an electrical connection with the electrically conductive core 52 (FIG. 9). Arms 54 and 56 of the terminals 24 (FIG. 3) are configured to receive therebetween a conductive element (not shown) associated with an external circuit, such as a conductive blade or a male pin terminal.

Figure 11:
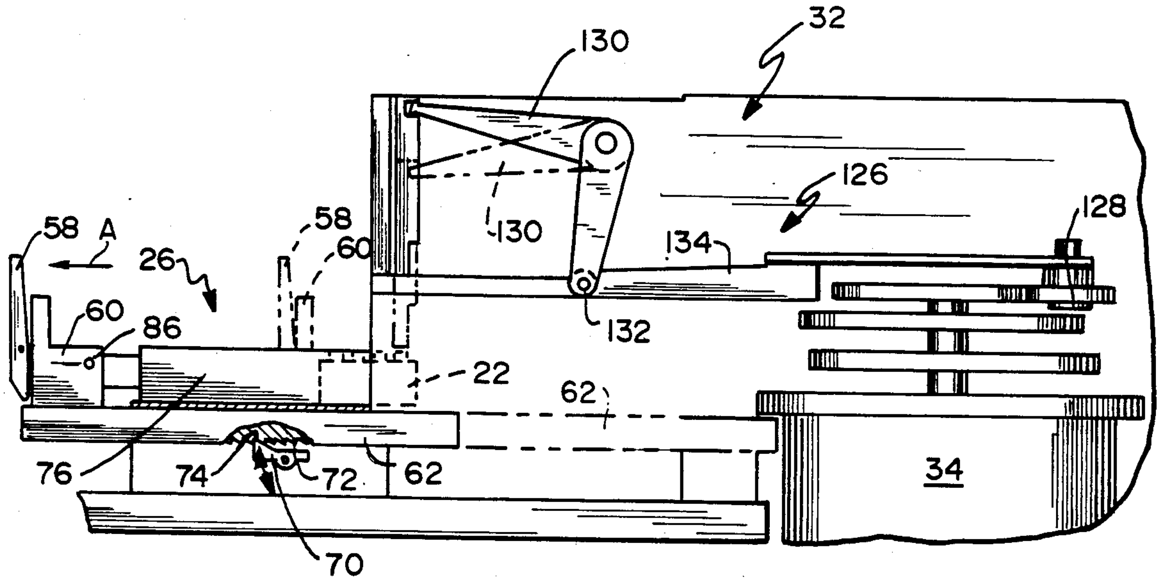
FIG. 11 is a sectional view taken along the line 11—11 of FIG. 1.

The connectors 22 are manually loaded into the connector nest 26 that is shown in FIGS. 1 and 11. A latch member 58 is received within a latch support member 60 that is mounted on a slide 62 and the slide is reciprocal to move the connectors 22 into the nest 26. By manually releasing the latch member 58 and pulling back (arrow "A"—FIG. 1) on the latch support member 60 the slide can be moved outwardly to receive the connectors. An upper surface 66 of the slide 62 supports the connectors 22 when inserted into the nest 26 with the partially preloaded terminals 24 extending upwardly. The slide 62 is adapted for stepwise movement in discrete steps corresponding to the centerline spacing between the terminals 24 by a spring biased pawl 70 and a cooperating ratchet 72 arranged in a conventional manner. At the end of each operational cycle of the tool 20, a tooth 74 of the pawl 70 slides over a tooth of the ratchet 72 to provide a next adjacent conductor receiving terminal portion 40 in position for termination. The slide 62 is positioned below a fixed frame or track 76 that has opposite side-walls 78 and 80 and a top wall 82. The latch support member 60 is slideably received within the track 76 between the opposite side-walls 78 and 80. A pair of guide pins 86 are provided on opposite sides of the latch support member 60 and are received within a channel or recess 88 provided in each of the opposite sidewalls 78 and 80 for accurately positioning the latch support member 60 within the fixed track 76. An area between the upper surface 66 of the slide 62, the side-walls 78 and 80 and the top wall 82 defines a recess or channel 84 for receiving one or more connectors 22. The top wall 82 includes an opening 90 extending along its length to enable passage of the members 58 and 60 that are manually moved with the guide pins 86 within the channels 88 maintaining the relative positioning and alignment through the track 76 to provide the connector or connectors 22 in a starting position as shown in dotted lines in FIG. 11 for termination of the first terminals in the opposed rows.

A divider support member 92 that is tapered to provide a thin lower portion 94 (FIGS. 1, 7, 8, 9 and 10) to fit between the opposed rows of terminals 24 and provide support for the opposed terminals 24 during the termination and terminal insertion operations.

Referring now to FIGS. 5, 6, 9 and 10, the termination assembly 30 includes a pair of movable side-wall supports 96 forming pockets that are advanced to be positioned between the adjacent terminal portions 40 on each side for accurately aligning and supporting the free-end terminal portions during the sequential termination of the opposed terminals 24. The side-wall supports 96 are then retracted after a conductor 50 is terminated into the then adjacent terminal portion 40. The side-wall supports 96 include a tapered nose portion 98 for first contacting the terminal portion 40 near the connector housing 36 and precisely maintaining alignment of the free-end terminal portion 40 of the terminals 24.

Figure 5:
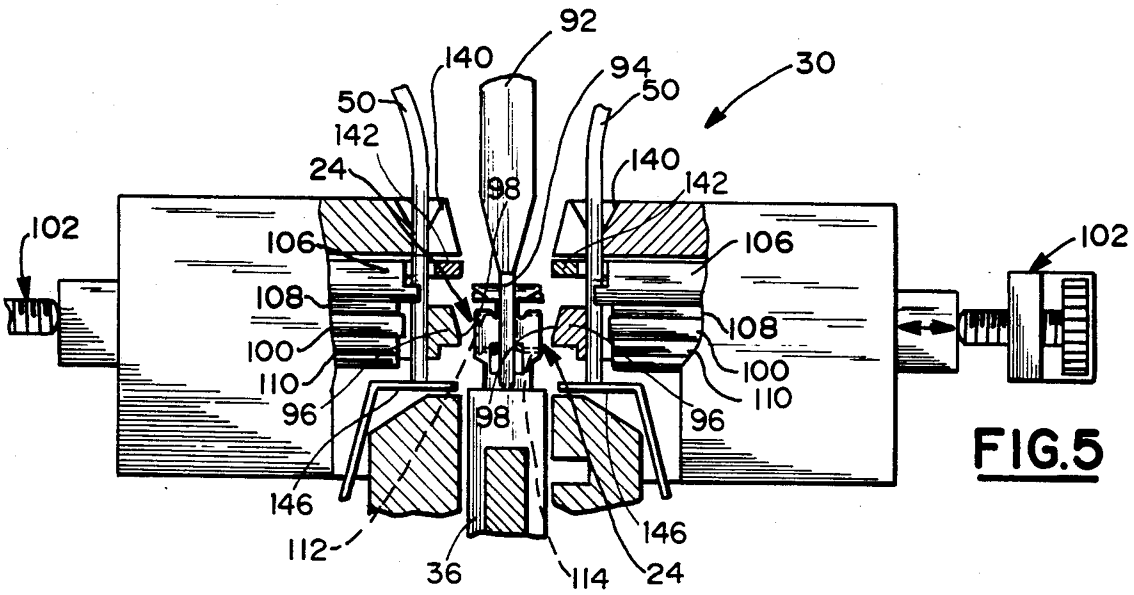
FIG. 5 is a fragmentary cross-sectional view taken along the line 5—5 of FIG. 1.
Figure 6:
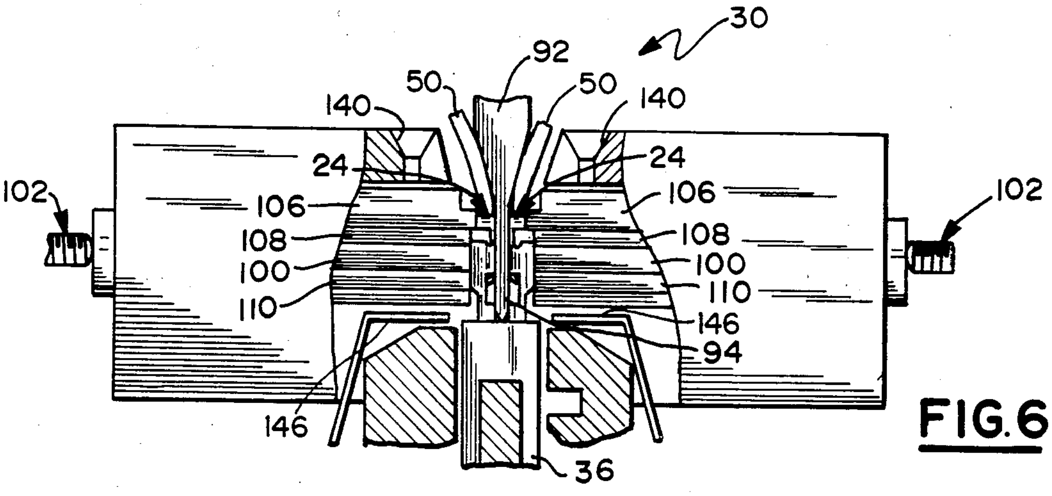
FIG. 6 is a view similar to FIG. 5 after the termination of the conductors into the terminals.

A pair of conductor insertion blades 100 are driven by a conductor insertion drive assembly 102 as shown in FIG. 1, and move between a first retracted position as illustrated in FIG. 5 and a terminating position as illustrated in FIG. 6, followed by return to the retracted position. Each conductor insertion blade 100 is adapted to engage a conductor 50 and move the conductor into an insulation displacement slot 42 of a terminal when the termination assembly is moved from its retracted position (FIG. 5) to its termination position (FIG. 6).

Figure 10:
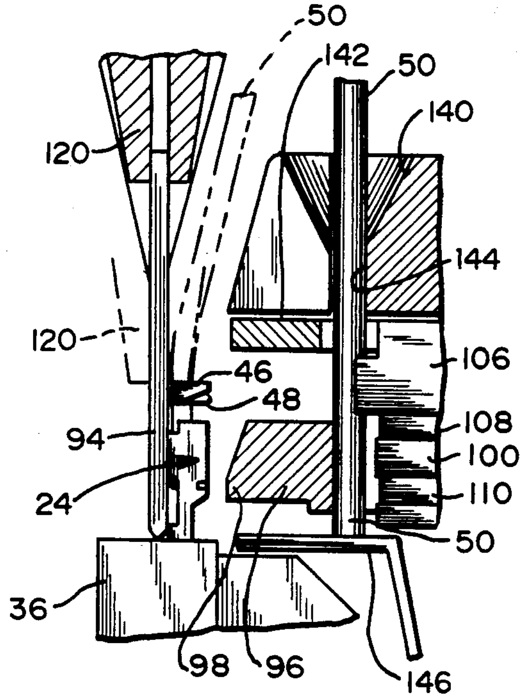
FIG. 10 is a sectional view taken along the line 10—10 of FIG. 7.

A crimp blade portion 106 of the insertion blade 100 is adapted to deform the arms 46 and 48 around the conductor 50 as shown in FIG. 10. A thin blade portion 108 is provided below blade portion 106 and a second thin portion 110 is provided spaced below the blade portion 108 for receipt within terminal slot portions 112 and 114 (FIG. 2) of an aligned terminal 24 during the termination process.

Referring to FIGS. 9–11, the terminal insertion assembly 32 includes a pair of terminal insertion blades 120 that include tapered arms 122 defining a channel 124. The arms are moved from a retracted position as shown in solid lines in FIG. 10 to a second position shown in dotted lines in FIG. 10 to engage the respective aligned terminals 24 and push the terminated terminal portions 40 fully into the terminal receiving cavities 38. A drive assembly 126 for the terminal insertion blades 120 is illustrated in FIGS. 1 and 11 includes a cam roller 128 coupled to a rocker arm 130 through a pivot connection 132 to a link arm 134. The rocker arm 130 is shown in dotted lines in FIG. 11 in a terminal insertion position wherein the terminal insertion blade has engaged the upstanding terminal portion 40 and has fully inserted the terminal within the connector housing 36.

Conductors 50 are manually inserted into opposite wire entry ports 140 and through wire gripper legs 142 that respectively define a conductor-guide channel 144, as shown in FIG. 10. A machine cycle begins when the conductors 50 are sufficiently inserted in the connector-guide channel 144 to engage a microswitch activator 146. A pair of void switches LEFT and RIGHT (FIG. 1) are provided for separate or simultaneous manual operation to start the machine cycle with only one conductor 50 inserted within the desired left or right conductor-guide channel 144 or without inserting conductors 50.

In the use of the semi-automatic fabricating tool 20, an operator loads a connector 22 into the nest 26 and moves the slide 62 to a starting position as before described. The operator then inserts a first pair of conductors 50 into the ports 140. The conductors 50 are received within the conductor-guide channels 144 and the first machine operational cycle commences when these first conductors engage the microswitch activator 146. The conductor insertion blades 100 are moved to their respective termination position (FIG. 6) and the first pair of conductors 50 are terminated into the opposed conductor-receiving terminal portions 40 of terminals 24. Thereafter the conductor insertion blades 100 are retracted from the terminal. The tooth 74 of the pawl 70 slides over the ratchet tooth 72 to position the next conductor-receiving terminal portions generally aligned with the now retracted conductor insertion blades 100. The operator then inserts a second pair of conductors 50 within the conductor-guide channels 144 and the machine cycle is repeated including an additional step of inserting the previously terminated conductors 50 and conductor-receiving terminal portions 40 fully within the housing 36 by operation of the terminal insertion blades 120 as before described. The operator continues to insert additional pairs of conductors 50 until the harness is completed.

For any machine cycle, the operator can insert a single conductor 50 in a desired left or right conductor-guide channel 144 and manually operate the LEFT or RIGHT void switch corresponding to the then empty channel 144 for termination of the single conductor 50. Also without inserting any conductors 50 the operator can simultaneously operate both the LEFT and RIGHT void switches for advancing to the next terminals 24 without termination of the previous terminals. When the last terminals 24 in the rows of a connector housing have been terminated, the connector 22 is advanced one step and the last terminated terminals are finally inserted into the housing. The operator then pulls back (arrow A—FIG. 1) on the latch support member 60 moving the slide 62 outwardly to the loading position (FIG. 11 in solid line), and removes the completed electrical harnesses 28. A new assembly cycle is then commenced by loading a fresh connector 22 into position on the slide 62 and moving the loaded slide inwardly (arrow B—FIG. 7) toward the termination position ready for wire termination and full insertion of the terminals into the connector housing as described.

Thus, the disclosed semi-automatic electrical harness fabricating method as described and the apparatus 20 are effective to fabricate electrical harnesses 28, which harnesses eliminate the need for any cover member(s) on the terminals because in a completed harness, all of the terminals 24 are fully inserted within the connector housing 36. Typical secondary operations, such as the subsequent removal of a carrier strip and/or the insertion of previously terminated terminals are likewise eliminated.

We claim:

1. A method of fabricating electrical harnesses, each harness including a connector electrically connected to a plurality of conductors comprising the steps of:

a. providing at least one connector, each connector having a plurality of terminals preloaded partially into a housing with a conductor-receiving terminal portion outside of the housing;

b. positioning the connector with a first conductor-receiving terminal portion spaced apart and generally aligned with a conductor insertion blade;

c. receiving a conductor within a conductor guide channel and detecting said conductor at a predetermined position within said conductor-guide channel;

d terminating said conductor into said first conductor-receiving terminal portion outside of the housing;

e. moving the connector carrying slide one step to position a next adjacent conductor-receiving terminal portion generally aligned with the conductor insertion blade;

f. detecting a next conductor at a predetermined position within said conductor-guide channel; and g. terminating said next conductor into said aligned conductor-receiving terminal portion outside of the housing and inserting said previously terminated conductor and terminal portion into the housing.

2. A method as recited in claim 1 further comprising the steps of:

sequentially repeating the steps of (e), (f) and (g) until the last one of said plurality of terminals is terminated.

3. A method as recited in claim 2 further comprising the steps of:

moving the connector one step; and inserting said last terminated conductor and connector-receiving terminal portion into the housing.

4. A method as recited in claim 1 wherein said step of terminating said conductor into said conductor receiving terminal portion includes the steps of:

supporting said conductor-receiving terminal portion; and moving said conductor into said conductor-receiving terminal portion.

5. A method as recited in claim 1 wherein said conductor-receiving terminal portion includes at least one insulation displacement slot and said conductor is an insulation clad conductor.

6. A method as recited in claim 1 wherein the step of inserting said terminated conductor and conductor-receiving terminal portion into the housing includes the steps of aligning a terminal insertion blade with said terminated terminal portion and moving said terminal insertion blade in contact engagement with said terminated terminal portion to fully insert said terminal portion into the housing.

7. A method as recited in claim 1 wherein said plurality of terminals are arranged in two opposed rows and the sequential steps of (a)–(g) are performed utilizing a pair of conductors.

8. Apparatus for fabricating electrical harnesses of the type including a connector electrically connected to a plurality of conductors, the connector having a plurality of terminals preloaded partially into an electrically insulative housing with a conductor-receiving terminal portion outside of the housing, the apparatus including a connector nest including a frame and a movable slide for receiving and positioning the connector at a starting position with a first conductor-receiving terminal portion spaced apart and generally aligned with a conductor insertion blade of a termination assembly, the movable slide being adapted for stepwise movement in discrete steps corresponding to the centerline spacing between adjacent terminals for sequentially positioning a next adjacent conductor-receiving terminal portion at the termination position, the apparatus being characterized by:

means for sequentially terminating said conductor into said adjacent conductor-receiving terminal portion; and means for sequentially inserting said terminated conductor and terminal portion into the connector housing.

9. An apparatus as recited in claim 8 wherein said terminating means includes means for supporting and aligning said conductor-receiving terminal portion and means for moving said conductor into said conductor-receiving terminal portion.

10. Apparatus as recited in claim 9 wherein said supporting and aligning means include a movable member having tapered arms adapted to be received between adjacent conductor-receiving terminal portions and the conductor-receiving terminal portion at the termination position.

11. An apparatus as recited in claim 9 wherein said means for moving said conductor into said conductor-receiving terminal portion includes a conductor insertion blade operatively coupled to a drive motor assembly for movement from a first retracted position to a terminating position and returning to said first retracted position.

12. An apparatus as recited in claim 11 wherein said conductor insertion blade includes a blade portion adapted to engage and deform strain relief arms around said conductors simultaneously with terminating said conductor into said aligned conductor-receiving terminal portion.

13. An apparatus as recited in claim 8 wherein said means for inserting said terminated conductor and terminal portion into the housing includes a terminal insertion blade having tapered arms adapted for contact engagement with said terminated terminal portion, and said terminal insertion blade being operatively coupled to a motor drive assembly for movement from a retracted position to a second position in contact engagement with the terminated terminal portion to move the terminated terminal portion fully within the connector housing and for returning to said first retracted position during an operational cycle of said apparatus.

14. An apparatus as recited in claim 8 further including manually operated switch means for selectively positioning a next adjacent conductor-receiving terminal portion at the termination position.

15. An apparatus as recited in claim 8 wherein said plurality of terminals are arranged in two opposed rows and said apparatus further comprising means for simultanegously terminating a pair of conductors into said opposed terminals and means for simultaneously inserting said terminated conductor and terminal positions into the connector housing.

16. An apparatus as recited in claim 15 further including means for selectively terminating said conductor into one of said opposed terminals.

17. A semi-automatic electrical harness fabricating tool, each harness including a connector electrically connected to a plurality of conductors, the connector having a plurality of terminals preloaded partially into an electrically insulative housing with a conductor-receiving terminal portion outside of the housing, said terminals being arranged in two opposed rows, the apparatus including a connector nest including a frame and a movable slide for receiving and positioning the connector at a starting position with a first opposed conductor-receiving terminal portions spaced apart and generally aligned with a pair of conductor insertion blades of a termination assembly, the moVable slide being adapted for stepwise movement in discrete steps corresponding to the centerline spacing between adjacent terminals for sequentially positioning a next adjacent, opposed conductor-receiving terminal portions at the termination position, the apparatus being characterized by:

means for supporting and aligning said opposed, conductor-receiving terminal portions;

means for sequentially terminating a pair of said conductors into said adjacent conductor-receiving terminal portions; and means for sequentially inserting said terminated conductor and opposed terminal portions into the connector housing.

18. A semi-automatic electrical harness fabricating tool as recited in claim 17 wherein said supporting and aligning means include a pair of movable members, each having tapered arms adapted to be received between adjacent conductor-receiving terminal portions and the conductor-receiving terminal portion at the termination position.

19. A semi-automatic electrical harness fabricating tool as recited in claim 17 further including manually operated switch means for selectively positioning a next adjacent, opposed conductor-receiving terminal portions at the termination position.

20. A semi-automatic electrical harness fabricating tool as recited in claim 17 further including means for selectively terminating said conductor into one of said opposed conductor-receiving terminal portions.

* * * * *